United States Patent [19]

Doi et al.

[11] Patent Number: 4,907,156
[45] Date of Patent: Mar. 6, 1990

[54] METHOD AND SYSTEM FOR ENHANCEMENT AND DETECTION OF ABNORMAL ANATOMIC REGIONS IN A DIGITAL IMAGE

[75] Inventors: Kunio Doi, Willowbrook; Heang-Ping Chan, Chicago; Maryellen L. Giger, Elmhurst, all of Ill.

[73] Assignee: University of Chicago, Chicago, Ill.

[21] Appl. No.: 68,221

[22] Filed: Jun. 30, 1987

[51] Int. Cl.$^4$ .......................... A61B 6/12; G06K 9/46
[52] U.S. Cl. .................... 364/413.13; 382/19; 382/6
[58] Field of Search .......................... 382/6, 19, 22, 54; 378/99; 358/111, 167; 364/414, 413.13, 413.22, 413.23

[56] References Cited

U.S. PATENT DOCUMENTS

| | | | |
|---|---|---|---|
| 3,980,885 | 9/1976 | Steward et al. | 250/307 |
| 4,259,582 | 3/1981 | Albert | 378/99 |
| 4,323,973 | 4/1982 | Greenfield | 382/6 |
| 4,437,161 | 3/1984 | Anderson | 364/414 |
| 4,453,266 | 6/1984 | Bacus | 382/6 |
| 4,463,375 | 7/1984 | Macovski | 358/111 |
| 4,503,461 | 3/1985 | Nishimura | 358/111 |
| 4,545,068 | 10/1985 | Tabata et al. | 382/41 |
| 4,618,990 | 10/1986 | Sieb, Jr. et al. | 382/22 X |
| 4,663,773 | 5/1987 | Haendle et al. | 378/99 |
| 4,723,553 | 2/1988 | Miwa et al. | 128/660 |
| 4,736,439 | 4/1988 | May | 382/54 |
| 4,747,156 | 5/1988 | Wahl | 382/54 |
| 4,751,643 | 6/1988 | Lorensen et al. | 364/414 |
| 4,769,850 | 9/1988 | Itoh et al. | 382/6 X |
| 4,792,900 | 12/1988 | Sones et al. | 364/413.23 |

OTHER PUBLICATIONS

Fox, S. H. et al., "A computer analysis of mammographic microcalcifications: global approach", Proceedings of the 5th International Conference on Pattern Recognition, Dec. 1980, 624–631.

Gale, A. G. et al., "Computer aids to mammographic diagnosis", *British Journal Radiol.*, vol. 60, No. 717, Sep. 1987, 887–889.

Fouroutan, I. et al., "Feature selection for automatic classification of non-Gaussian data", *IEEE Trans. Syst., Man & Cybernetics*, vol. SMC-17, No. 2, Mar.-Apr. 1987, 187–198.

Spiesberger, W., "Mammogram Inspection by Computer", *IEEE Trans. on Biomed. Engin.*, vol. BME-26, No. 4, Apr. 1979, 213–219.

*Primary Examiner*—Clark A. Jablon
*Attorney, Agent, or Firm*—Oblon, Spivak, McClelland, Maier & Neustadt

[57] ABSTRACT

A method and system for detecting and displaying abnormal anatomic regions existing in a digital X-ray image, wherein a single projection digital X-ray image is processed to obtain signal-enhanced image data with a maximum signal-to-noise ratio (SNR) and is also processed to obtain signal-suppressed image data with a suppressed SNR. Then, difference image data are formed by subtraction of the signal-suppressed image data from the signal-enhanced image data to remove low-frequency structured anatomic background, which is basically the same in both the signal-suppressed and signal-enhanced image data. Once the structured background is removed, feature extraction, is performed. For the detection of lung nodules, pixel thresholding is performed, followed by circularity and/or size testing of contiguous pixels surviving thresholding. Threshold levels are varied, and the effect of varying the threshold on circularity and size is used to detect nodules. For the detection of mammographic microcalcifications, pixel thresholding and contiguous pixel area thresholding are performed. Clusters of suspected abnormalities are then detected.

20 Claims, 14 Drawing Sheets $$\text{EFFECTIVE DIAMETER} = 2\sqrt{\frac{\text{AREA OF ISLAND}}{\pi}}$$

$$\text{DEGREE OF CIRCULARITY} = \frac{\text{AREA OF ISLAND WITHIN CIRCLE}}{\text{AREA OF ISLAND}}$$

METHOD AND SYSTEM FOR ENHANCEMENT AND DETECTION OF ABNORMAL ANATOMIC REGIONS IN A DIGITAL IMAGE

BACKGROUND OF THE INVENTION

1. Field of the Invention

This invention relates generally to radiographic systems, and more particularly to the processing of X-ray images using feature-extraction techniques.

2. Discussion of Background

Detection and diagnosis of abnormal anatomical regions in radiographs, such as cancerous lung nodules in chest radiographs and microcalcifications in women's breast radiographs, so called mammograms, are among the most important and difficult tasks performed by radiologists.

Recent studies have concluded that the prognosis for patients with lung cancer is improved by early radiographic detection. In one study on lung cancer detection, it was found that, in retrospect, 90% of subsequently diagnosed peripheral lung carcinomas were visible on earlier radiographs. The observer error which caused these lesions to be missed may be due to the camouflaging effect of the surrounding anatomic background on the nodule of interest, or to the subjective and varying decision criteria used by radiologists. Underreading of a radiograph may be due to a lack of clinical data, lack of experience, a premature discontinuation of the film reading because of a definite finding, focusing of attention on another abnormality by virtue of a specific clinical question, failure to review previous films, distractions, and "illusory visual experiences".

Similarly, early diagnosis and treatment of breast cancer, a leading cause of death in women, significantly improves the chances of survival.

X-ray mammography is the only diagnostic procedure with a proven capability for detecting early-stage, clinically occult breast cancers. Between 30 and 50% of breast carcinomas detected radiographically demonstrate microcalcifications on mammograms, and between 60 and 80% of breast carcinomas reveal maicrocalcifications upon microscopic examination. Therefore any increase in the detection of microcalcifications by mammography will lead to further improvements in its efficacy in the detection of early breast cancer. The American Cancer Society has recommended the use of mammography for screening of asymptomatic women over the age of 40 with annual examinations after the age 50. For this reason, mammography may eventually constitute one of the highest volume X-ray procedures routinely interpreted by radiologists.

A computer scheme that alerts the radiologist to the location of highly suspect lung nodules or breast microcalcifications should allow the number of false-negative diagnoses to be reduced. This could lead to earlier detection of primary lung and breast cancers and a better prognosis for the patient. As more digital radiographic imaging systems are developed, computer-aided searches become feasible. Successful detection schemes could eventually be hardware implemented for on-line screening of all chest radiographs and mammograms, prior to viewing by a physician. Thus, chest radiographs ordered for medical reasons other than suspected lung cancer would also undergo careful screening for nodules.

On radiographs, the presence of nodules is obscured by overlying ribs, bronchi, blood vessels, and other normal anatomic structures. Kundel et al. (in) *Optimization of chest radiography*, HHS Publication (FDA), 80-8124, Rockville, Md., 1980, introduced the concept of conspicuity to describe those properties of an abnormality and its surround which either contribute to or distract from its visibility. Kelsey et al. in the same publication investigated factors which affect the perception of simulated lung tumors and found that the visibility of lesions varied with their location on chest radiographs. Thus, a computerized search scheme would have to be capable of locating nodules that have varying degrees of conspicuity (i.e., nodules immersed in backgrounds of various anatomic complexity).

Research on computerized nodule-search methods has been limited. Of those attempted, geometry-based detection schemes (such as edge detection methods) were applied to the original image, or to a high-frequency enhanced image, without elimination of the structured background of the normal lung anatomy. Basically, none of the prior methods known to the inventors has been sufficiently successful to warrant large-scale clinical trials.

Several investigators have attempted to analyze mammographic abnormalities with digital computers. However, the known studies failed to achieve an accuracy acceptable for clinical practice. This failure can be attributed primarily to a large overlap in the features of benign and malignant lesions as they appear on mammograms.

The currently accepted standard of clinical care is such that biopsies are performed on 5 to 10 women for each cancer removed. Only with this high biopsy rate is there reasonable assurance that most mammographically detectable early carcinomas will be resected. Given the large amount of overlap between the characteristics of benign and malignant lesions on mammograms, computer-aided detection rather than characterization of abnormalities may eventually have greater impact in clinical care. Microcalcifications represent an ideal target for automated detection, because subtle microcalcifications are often the first and sometimes the only radiographic findings in early, curable, breast cancers, yet individual microcalcifications in a suspicious cluster (i.e., one requiring biopsy) have a fairly limited range of radiographic appearances.

The high spatial-frequency content and the small size of microcalcifications require that digital mammographic systems provide high spatial resolution and high contrast sensitivity. Digital mammographic systems that may satisfy these requirements are still under development. Digital radiographic systems with moderately high spatial resolution are made possible by fluorescent image plate/laser readout technology. Currently, digital mammograms with high resolution can be obtained by digitizing screen-film images with a drum scanner or other scanning system. The increasing practicability of digital mammography further underlines the potential ability of a computer-aided system for analysis of mammograms.

SUMMARY OF THE INVENTION

Accordingly, an object of this invention is to provide an automated method and system for detecting and displaying abnormal anatomic regions existing in a digital x-ray image.

Another object of this invention is to provide an automated method and system for providing reliable early diagnosis of abnormal anatomic regions.

A further object of this invention is to provide an automated method and system for selecting and displaying abnormal anatomic regions by eliminating structured anatomic background before applying feature extraction techniques.

Yet another object of this invention is to minimize patient exposure to x-ray radiation by providing an automated method and system for detecting and displaying abnormal anatomic regions based on the digital information provided in a single x-ray image of the anatomy under diagnosis.

These and other objects are achieved according to the invention by providing a new and improved automated method and system in which prior to feature extraction, a single projection x-ray image is processed to obtain signal-enhanced image data with a maximum signal-to-noise ratio (SNR) of a suspected abnormal region and is also processed to obtain signal-suppressed image data with a suppressed SNR. Then, according to the invention, difference image data are formed by subtraction of the signal-suppressed image data from the signal-enhanced image data to remove low-frequency structured background, which is basically the same in both the signal-suppressed and signal-enhanses image data.

Further according to the invention, once the structured background is removed, feature extraction, based on for example thresholding, circularity and size is performed. Threshold levels are varied and the effect of the variation on circularity and size is used to detect abnormalities, such as lung nodules. Another feature extraction technique is to test for clusters of suspected abnormalities, such as mammographic microcalcifications.

BRIEF DESCRIPTIONS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
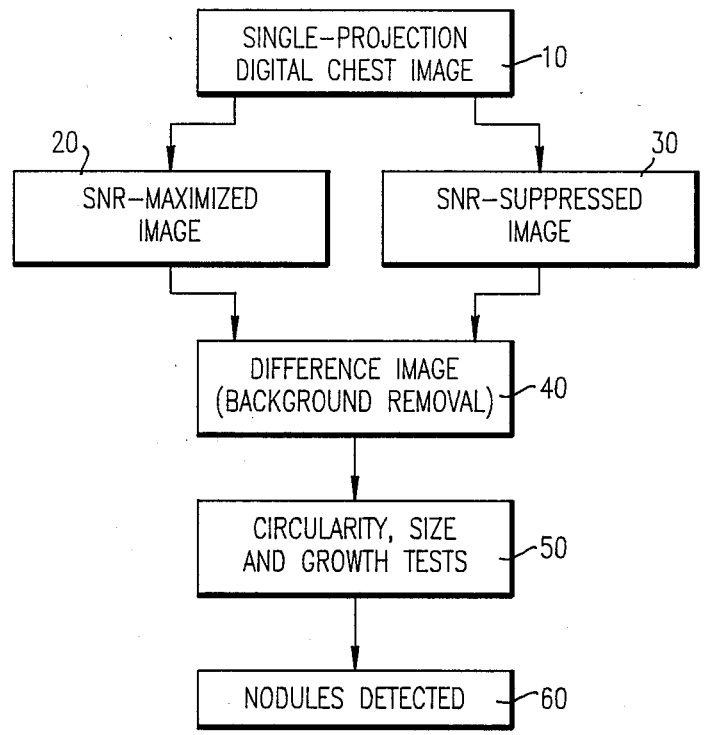
FIG. 1 is a schematic diagram illustrating the automated system for nodule detection according to the invention.

Referring now to the drawings, wherein like reference numerals designate identical or corresponding parts throughout the several views, and more particularly to FIG. 1 thereof, a schematic diagram of the nodule detection scheme is shown The technique begins with an attempt to increase the conspicuity of nodules by eliminating the "camouflaging" background of the normal lung anatomy This is accomplished by obtaining a single-projection digital chest image (step 10) and creating two images from a single-projection chest image: in one of the two, the signal-to-noise ratio (SNR) of the nodule is maximized, (step 20) and in the other, the nodule SNR is suppressed (step 30), while the background remains essentially the same. Then the difference is obtained (step 40). The difference between these two processed images consists of the nodule superimposed on a relatively uniform background in which the detection task is greatly facilitated. This difference image approach differs fundamentally from conventional subtraction techniques (e.g., temporal or dual-energy subtraction) in that the two sets of image data, i.e., SNR enhanced and SNR suppressed, are obtained from the same single-projection chest radiograph.

With the SNR-maximizing filter, the goal is to enhance those characteristics of a nodule which are different from the characteristics of the normal anatomic background. A spatial filter which is matched to the two-dimensional profile of a given nodule is expected to yield, upon processing, a maximal response at the location of that nodule (the position of maximal correlation).

However, the use of multiple filters, each matched to one of an infinite number of conceivable nodule sizes and shapes, is quite impractical and probably impossible. Thus, it is necessary to find a few matched filters, or perhaps just one, which will enhance, to some degree, nodules of various sizes and shapes. Therefore filters were investigated, each of which was matched to the profile of some simulated nodule; i.e., the filter was proportional to the Fourier spectrum of a simulated nodule of a given size and contrast. This matched filter did not take into consideration the background noise in the radiographic image. Three matched filters which corresponded to simulated nodules having diameters of 6, 9, and 12 mm were investigated.

In particular, the effect of the three matched filters on a 512×512 section of a chest image containing two real and seven simulated nodules (ranging from 6 mm to 15 mm in diameter and from 35 to 65 in contrast in terms of digital pixel value) have been examined. It was found that the SNR-maximizing filter that was matched to a 6 mm diameter nodule was too sensitive to small, high-contrast portions of rib edges and thus yielded many false-positives. On the other hand, the filter that was matched to a 12 mm diameter nodule did not have a sufficient high-frequency content, and thus small nodules were missed in the detection process. Therefore, an SNR-maximizing filter that was matched to a 9 mm nodule was used.

The SNR-suppressing filter is intended to reduce the predominance of the nodule in the image while producing a background similar to that obtained with the SNR-maximizing filter. The "SNR-suppressed" image is produced from the original digitized chest image by means of a two-dimensional spatial-smoothing filter (linear or non-linear). Linear filters examined included uniform rectangle functions (which correspond to sinc functions in the spatial-frequency domain) and Gaussian functions having standard deviations of 6, 9, 12, 24, and 36 mm. Non-linear filters examined included median filters and modified median filters. The modified median filter differs from the conventional median filter in that the pixels which are used in determining the median value about some pixel location are not immediately adjacent to each other, but rather lie along a circumference at a given radial distance from the pixel location in question.

With the SNR-suppressing filters, it was found that uniform rectangle and Gaussian functions with the same rms size yielded similar results. The modified median filter and the conventional median filter appeared promising in that thresholding of the difference image yielded many islands which corresponded to nodules. However, the resulting islands in the difference image had jagged edges which gave misleadingly low circularity measurements. The combination of the 9 mm matched filter with the 12 mm by 12 mm uniform rectangle function yielded the highest number of nodule islands and the lowest number of non-nodule islands during thresholding of the difference image.

After the two filtered images are obtained from the original image, a difference image is computed. In one evaluation performed 512×512 portion of an original chest image was used. A 10 mm simulated nodule was positioned in the middle of the lung field and partially overlapping a rib. The difference image was obtained using a matched filter corresponding to a 9 mm nodule with a contrast of 65 in terms of digital pixel value for maximizing the SNR of the nodule. Both filtering operations were performed in the frequency domain with the aid of a fast-Fourier-transform (FFT) algorithm. The conspicuity of the nodule in the difference image was thereby increased and the complexity of the normal lung background was reduced, although the overall structure of the lung was still visible.

Figure 2A:
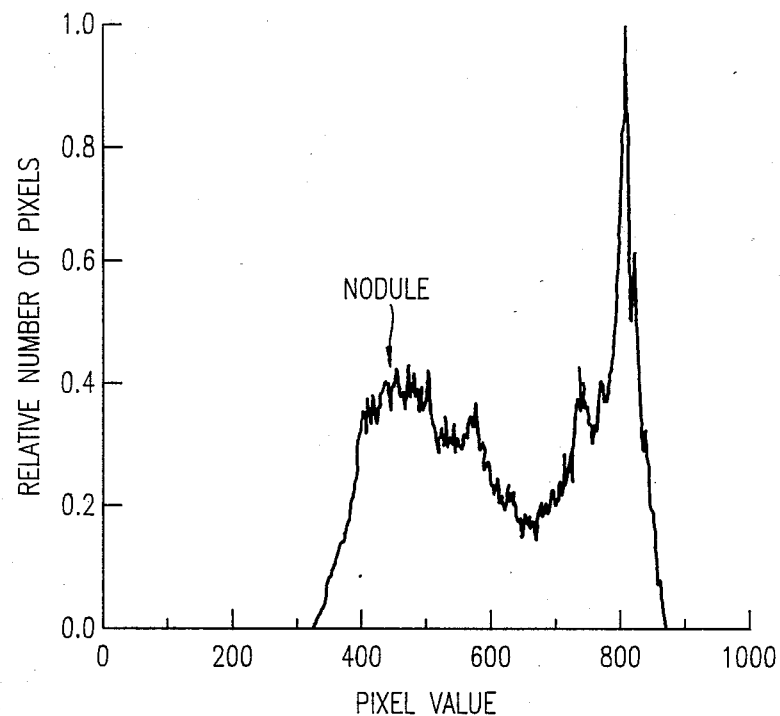
FIGS. 2a and 2b are histograms of the original image and the difference image, respectively, obtained according to the invention, with the pixel value of the nodule indicated by an arrow.
Figure 2B:
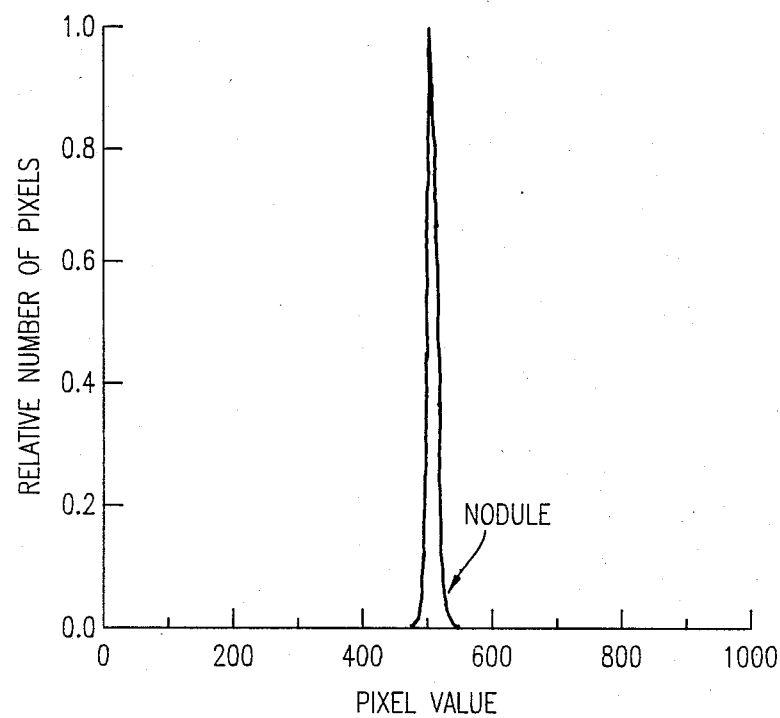

Histograms of the original image and of the difference image above described are shown in FIGS. 2(a) and 2(b), respectively. Since only one quarter of the chest is analyzed, the range of the histogram, i.e., the dynamic range, of the original chest image is only approximately 500 pixel values. The pixel value of the nodule is indicated by an arrow on the histograms. In the original image, it is apparent that the pixel value of the nodule is comparable to those of other lung structures. If the location of the nodule is varied relative to the other lung structures, then the pixel value of the nodule may vary within the dynamic range shown. However, the pixel value of the nodule in the difference image is always located at the high end of the histogram and is isolated from most of he other structures. Also, the histogram of the difference image is very narrow. These histograms demonstrate that, with the difference image approach, one can successfully eliminate the effect of the unwanted anatomic background.

Next described are feature extraction techniques including circularity, size and growth tests (step 50) employed to detect a lung nodule (step 60), schematically illustrated in FIG. 1.

Once the difference image is obtained from the "SNR-maximized" and "SNR-suppressed" images, feature-extraction techniques are used to isolate possible nodules while disregarding other structures. Because of the difference in the spectral contents of the SNR-maximized and SNR-suppressed images, the backgrounds resulting after filtering are not identical, and thus the "structured noise" is not completely eliminated in the difference image. However, the conspicuity of the nodule is increased, and therefore extraction of the nodule from the simplified background becomes easier than that from the original, complex anatomic background. The nodule is extracted by thresholding the difference image and performing tests for circularity and size and evaluating their change with variation of threshold level; the latter being referred to as a "growth" test.

Thresholding on the difference image is performed at various pixel values (threshold levels). The pixel values above a given threshold level correspond to a specific upper percentage of the area under the histogram. For example, the threshold level corresponding to the upper 4% of the histogram area in FIG. 2(b) is 525. It should be noted that, as the percentage increases, the threshold level decreases.

Pixel values below the threshold level are set to a constant background value, giving rise to an image of "islands." As the pixel threshold level is lowered so that a greater number of the pixel population as a % of the histogram exceeds the threshold, i.e., as the histogram percentage is increased from 4% to 8%, the islands grow and their shapes vary. The invention utilizes the way in which the various islands grow with decreasing threshold levels as a means of characterizing and distinguishing between those islands that result from nodules and those that arise from non-nodules (i.e., normal lung structures). At each threshold level, the islands are loaded automatically with simple computer searching techniques and then submitted for shape and size testing.

Figure 3:
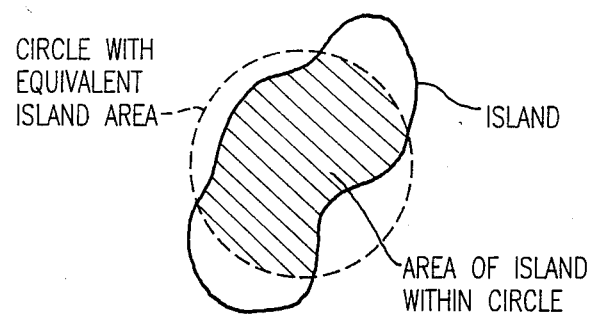
FIG. 3 is an illustration of the effective diameter and degree of circularity of an island.

FIG. 3 schematically illustrates the measures for the size and circularity of a given island. The area of the island corresponds to the number of connected pixels at and above the threshold level. The effective diameter is defined by the diameter of a circle having the same area as that of the island. The degree of circularity is defined as the ratio of the area of the island that lies within the equivalent circle, which is centered about the centroid of the island, to the area of the island.

Figure 4:
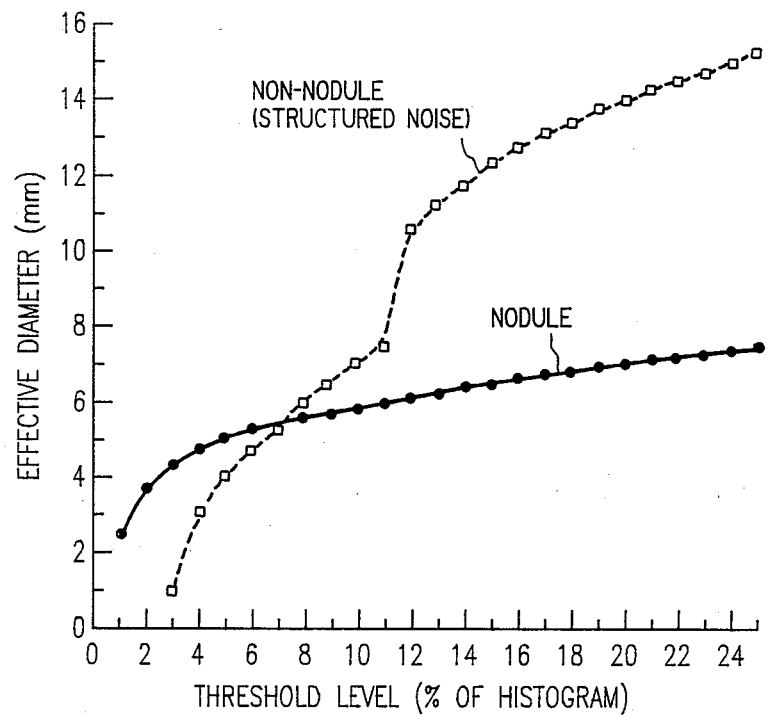
FIG. 4 is a graph illustrating dependence of island size on threshold level for a nodule and a non-nodule.

The growth of each island is monitored at discrete intervals of the threshold level. FIG. 4 demonstrates the dependence of island size on the threshold level for a nodule and a non-nodule. The threshold level is varied in increments of 1% of the area of the difference image histogram. The size of the island is expressed in terms of the effective diameter in mm. It should be noted that, as the threshold level decreases, i.e., as more pixels are included in difference image displayed, the nodule island gradually grows in size as compared to the non-nodule island. The sudden increase in the effective diameter of the non-nodule island, which is caused by a merging of the island with another non-nodule island, is typical of non-nodules in the peripheral region of the chest. A typical example of the non-nodule is a rib edge.

Figure 5:
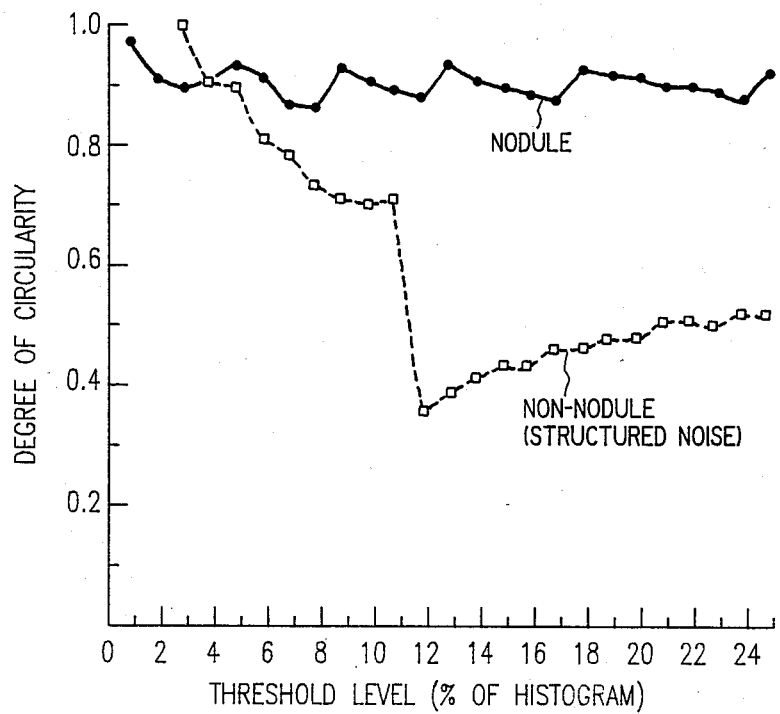
FIG. 5 is a graph illustrating the dependence of island circularity on threshold level for a nodule and a non-nodule.

FIG. 5 illustrates the dependence of island circularity on the threshold level for a nodule and a non-nodule. The circularity of the nodule island remains above approximately 0.85 as the threshold level is changed over a wide range. However, the circularity of the non-nodule island decreases. The sudden decrease in circularity for the non-nodule island indicates the merging of the island into another island.

Figure 6:
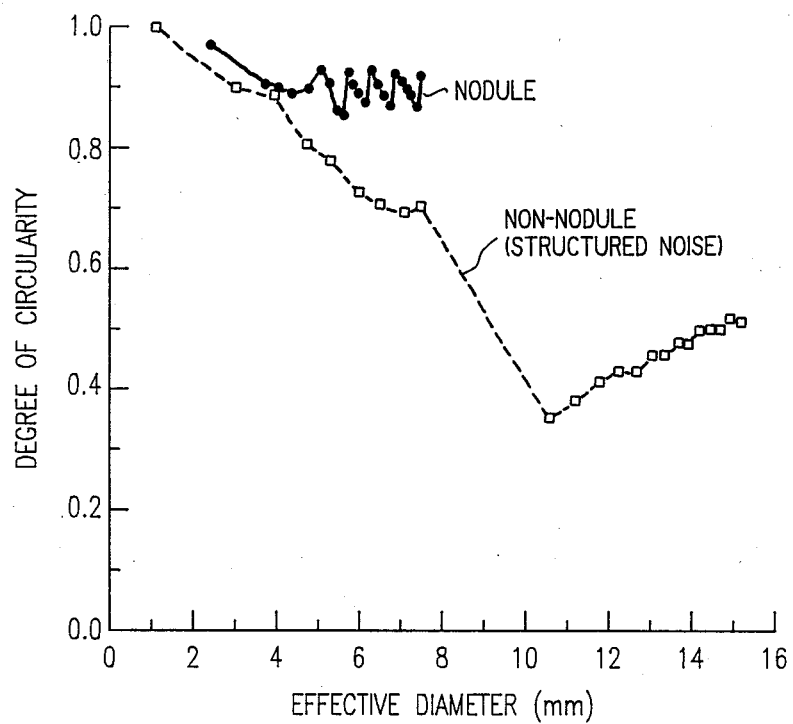
FIG. 6 is a graph illustrating variation of island circularity and size for various threshold levels for a nodule and a non-nodule.

The variation of island circularity and size for various threshold levels is shown in FIG. 6. These growth characteristics of islands, as demonstrated in FIGS. 4–6, are used in accordance with the invention in order to distinguish between nodules and non-nodules. An island is rejected if the size and circularity do not remain at predetermined levels for a certain number of consecutive threshold levels (in increments of 1% of the histogram). The inventors have used a two-choice criterion that an island had to satisfy in order to be considered a nodule. The island must either (1) have an effective diameter between 3 and 18 mm and a circularity of at least 0.85 for 10 consecutive threshold levels or (2) have an effective diameter between 9 and 18 mm and a circularity of at least 0.75 for 4 consecutive threshold levels. The two-choice criterion was used in order to detect both small and large nodules; the first criterion being for small and medium-size nodules and the second criterion for large nodules. Usually, non-nodule islands are small initially, grow relatively quickly because they merge with other non-nodule islands, and have a low degree of circularity when their effective diameters become greater than 9 mm. However, in order to detect very small and very large nodules, a multiple-test criterion has been used.

It should be noted that once the original digital chest image is input to the computer, the nodule detection process is totally automated. After the distinction between nodules and non-nodules has been made automatically, the detection results can be presented to a radiologist for the final decision.

Figure 7:
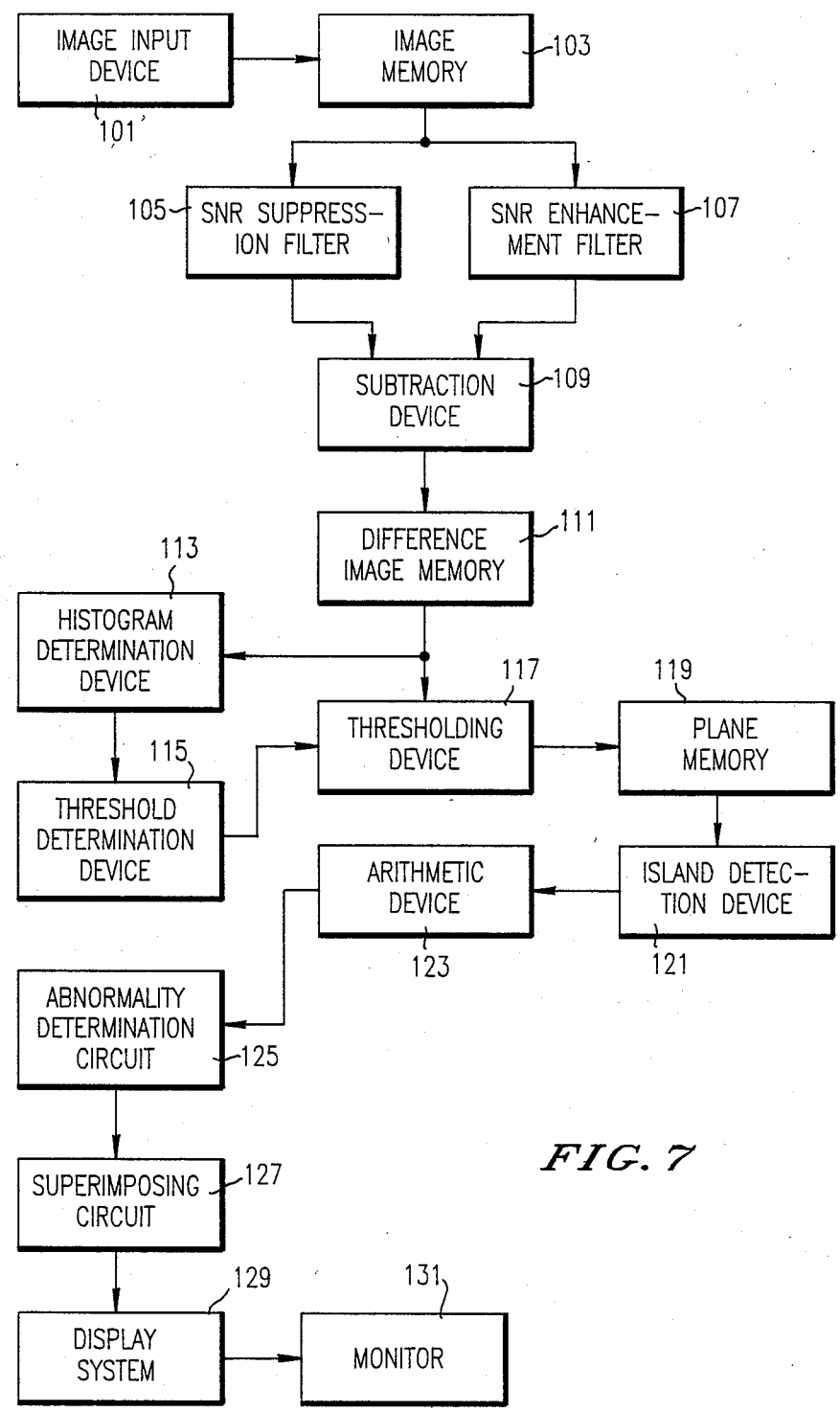
FIG. 7 is a schematic block diagram illustrating in more detail the automated system for nodule detection shown in FIG. 1.

FIG. 7 is a more detailed schematic block diagram illustrating the system of the invention. Referring to FIG. 7, x-ray measurements of an object are obtained from an image signal generator 100, for example, the output of the television camera in a fluoroscopic system or the film digitizer for digitizing clinical film images, etc. The image signal is applied to a first memory 103 where an original image can be stored.

The digitized image signal is applied in parallel to a SNR-suppressing filter 105 referred to as a median filter which is a non-linear spatial filter for replacing each pixel value with the median of the pixel values within a kernel of chosen size and shape centered at the pixel of interest, and a SNR-maximizing filter 107 referred to as a matched filter for enhancing those characteristics of the suspicious abnormal regions which are different from the characteristics of the normal anatomic background.

Subtraction device 109 takes the two filtered images, the SNR-suppressed image and the SNR-enhanced image, and provides a difference image, in which the conspicuity of the suspected abnormalities is increased and the component of common structured background to those two images is reduced, which is stored in a second memory 111.

Using the histogram a predetermined threshold level is set in a threshold determination device 115 according to several methods. One is a global thresholding method in which the computer retains a pre-selected percentage of pixels with values at the high end of the histogram of the difference image, the other is a local thresholding method in which the computer determines the local statistics within a square kernel centered at a pixel of interest.

In a thresholding device 117 a thresholding operation is performed on the difference image at a given threshold level which is determined in the thresholding determination device 115 corresponding to a specific area of the calculated histograms. The pixel value is retained only if it is larger than the mean pixel value by a pre-selected multiple of the standard deviation.

The difference image stored in a second memory 111 is binary-coded by comparing each pixel value of the difference image with the threshold level and based on the comparison writing either "1" or "0" into plane memory system 119. Plane memory 119 has the same number of addresses as the second memory 111. For example, if the pixel value is equal to or above the thresholding value, "1" is stored, on the contrary, if the pixel value is below the thresholding value, "0" is stored in the plane memory 119 at the pixel address. The thresholding results in forming "a threshold image" in the memory 119, which contains group of pixels with values above the thresholding superimposed on the absolutely uniform background.

The threshold image formed in the memory 119 with the suspicious abnormal regions on the radiograph is subjected to the feature extraction techniques. In case of extracting lung nodules in digital chest x-ray images, tests for circularity and size are performed on the threshold difference image of the chest radiograph, and in case of extracting microcalcifications in digital x-ray mammograms, discussed in more detail hereinafter a clustering technique is used to identify clusters of pixels exceeding a threshold within a pre-selected diameter.

In FIG. 7, "Island" detection device 121 generates an image of "islands" which are the groups of "1" pixels juxtaposed with one another on the plane memory 119. The islands are located automatically with simple computer searching, for example, repeating procedures of checking pixels surrounding the pixel with "1", and clustering each group of the "1" pixels issuing a particular identification for each island and the addresses of the "1" pixels in the memory 119 as incidental information.

After locating and clustering the islands in the island detection device 121, arithmetic circuit 123 carries out the measures for the size and circularity of a given island in the manner in which the area of the island at and above the threshold level is determined and displayed, the effective diameter is defined by the diameter of a circle having the same area as that of the island, and the degree of circularity is defined as the ratio of the area of the island that lies within the equivalent circle, which is centered about the centroid of the island, to the area of the island as shown in FIG. 3.

The calculated factors in the arithmetic circuit 123 are applied to abnormality determination circuit 125 where determination is made whether the given island is abnormal, i.e., whether or not it is a nodule, by comparing with a predetermined value.

The above mentioned procedures take place at threshold levels which are varied in increments, with the variation increasing with the percentage of the difference image histogram under consideration. As the threshold level is varied, the islands grow and their shapes vary. The characterizing and distinguishing operation are performed on those new born islands, and if the island successively results in a determination of abnormality regardless of variation of the threshold levels, the island is confirmed and recognized as a nodule.

The result from the thresholding and growth tests are also applied to display system 129 so that the output signal represented by the island of the nodule in the difference image is superimposed on the original image, and displayed on the screen of the display system 129 comprising monitor 131. Alternative indication of the island which is distinguished as a nodule can be obtained by using an indicator, such as box, circle, cursor, or arrow etc., to be displayed on the same screen of the monitor 131 on which the original image is displayed.

Figure 8:
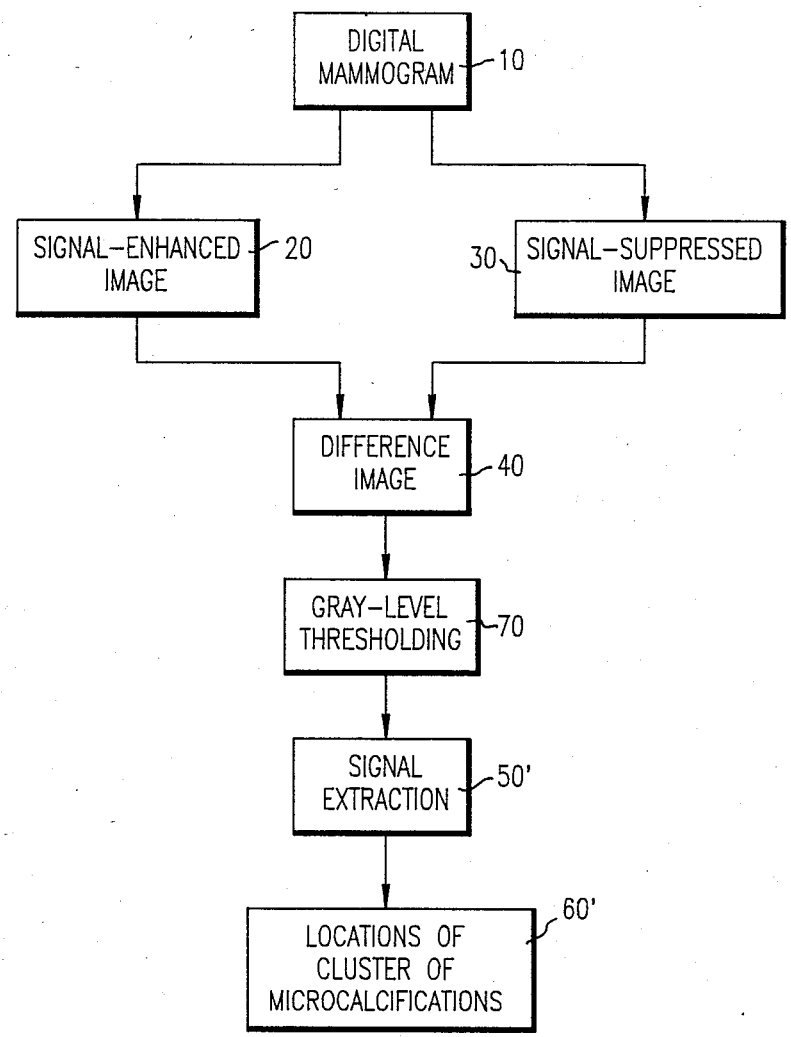
FIG. 8 is a schematic block diagram of the automated system for detection of microcalcifications in mammograms according to a second embodiment of the invention.

Many of the principles above described are also applicable to the analysis of digital mammograms. FIG. 8 indicates the general scheme of the mammogram computer algorithm. Once again, an input digital image, in the form of a mammogram is obtained (step 10) and subjected to spatial filtering to obtain signal-enhanced image data (step 20) and signal-suppressed image data (step 30). Subtracting the two image data results in difference image data in which the structured background is removed (step 40). Once again, it should be noted that the difference image obtained is fundamentally different from a subtraction image obtained from techniques such as digital subtraction angiography in that the two images being subtracted to obtain the difference image are derived from a single image. Grey-level thresholding (step 70) and signal-extraction processing (step 50') based on the known physical characteristics of microcalcifications are then applied to the difference image to isolate the signals from the remaining noise background. The output of the computer algorithm indicates the locations of suspicious clusters of microcalcifications on the mammograms (step 60').

For the purpose of signal enhancement (step 20), a spatial filter approximately matched to the size and contrast variations of a typical breast microcalcifications is employed. This spatial filter, referred to as a matched filter in the following discussions, is different from a conventionally defined matched filter described by Pratt, *Digital Image Processing* (Willy, New York, 1978), in two respects. First, it does not take into account the frequency content of the correlated noise in the image background. Second, since the size and shape of microcalcifications vary, it is not possible to design filters that exactly match each different microcalcifications. A simplified model in which a matched filter having an n×n square kernel, where n is an odd number, therefore is used and applied to an entire image. The dependence of detection accuracy on the kernel size of a matched filter was then studied. Furthermore, based on an analysis of the two-dimensional profiles of some typical microcalcifications, the contrast variation of microcalcifications was approximated with the following weighting factors for the matched filters. When n was equal to 3, the 8 outermost weighting factors of the filter response function were assigned a value of 0.75 and the central weighting factor was assigned a value of 1.0. When n was greater than 3, the outermost weighting factors were assigned a value of 0.5, the second outermost weighting factors were assigned a value of 0.75, and all other weighting factors were assigned a value of 1.0. These simplified matched filters provided an output measure of the correlation between the filter response function and the spatial variation of the image. Therefore, at the locations of microcalcifications, the peak values of pixels in the filtered image were increased relative to the pixel values of random noise or structured noise, which tend to correlate less with the filter response function.

To produce a signal-suppressed image (step 30), two types of filters, median filters and contrast-reversal filters were evaluated. A median filter is a non-linear spatial filter that replaces the value of a given pixel with the median of pixel values within a kernel of chosen size and shape centered at the pixel of interest. A median filter with properly chosen kernel size can virtually eliminate microcalcifications from the image and also smooth the noise without changing the global background. Because of the relatively random shapes and orientations of microcalcifications, median filters with a square kernel were used. The dependence of detection accuracy on the size of the filter was studied.

Figure 9:
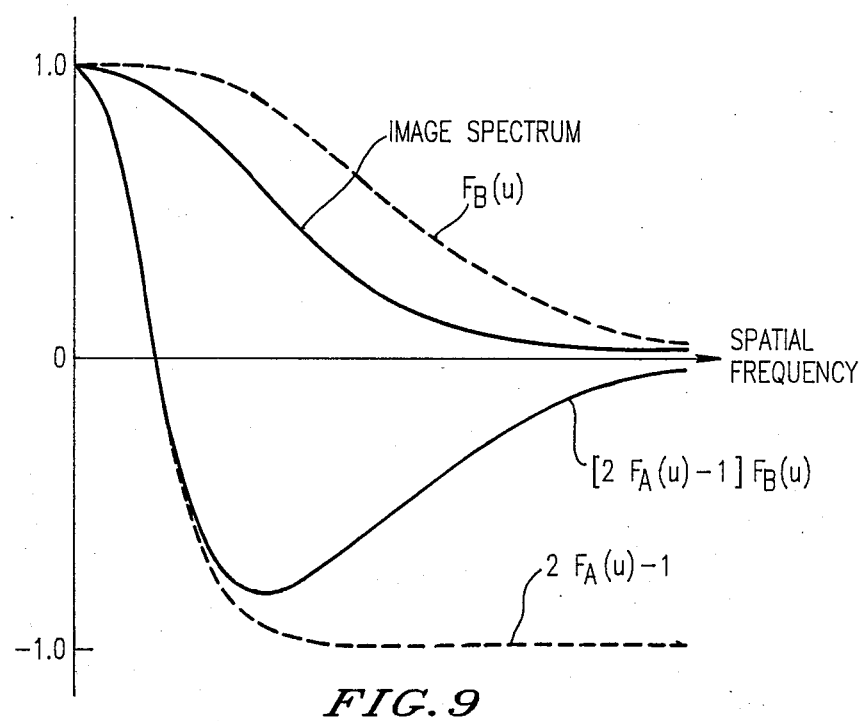
FIG. 9 is a graph providing a schematic illustration of a contrast-reversal filter.

In order to enhance the signal-to-noise ratio (SNR) while removing the structured background in the difference image, a second, alternative approach to signal suppression was investigated. A contrast-reversal filter was developed to selectively reverse the contrast of microcalcifications while maintaining the low-frequency structured background and suppressing high-frequency noise. These functions can be accomplished by a filter having optical transfer factors (OTFs) of the form:

$$F(u) = [2F_A(u) - 1]F_B(u),$$

in which $F_A(u)$ is a low-pass smoothing filter and $F_B(u)$ is a filter that suppresses high-frequency noise. A contrast-reversal filter is illustrated schematically in FIG. 9. If the parameters of $F_A(u)$ and $F_B(u)$ are properly chosen, the resulting filter $F(u)$ can have a large negative component in the frequency range that contains most of the frequency content of the microcalcifications.

In a study in development of the present invention filters A and B with simple square kernels in the spatial domain were employed. Filter A had weighting factors similar to those of the matched filters described above.

Filter B had uniform weighting factors regardless of its kernel size, $n_B$.

In the mammographic application of the present invention, once again a difference image is obtained by subtracting a signal-suppressed image from a signal-enhanced image. Since the low-frequency structured backgrounds are basically the same in these two images, this component will be removed from the difference image. In order to compensate for the loss in the background level, a constant value of 512 is added to every pixel of the difference image for display purposes.

Further grey-level thresholding is applied to the difference image in order to isolate microcalcifications from the remaining noise background. Two types of grey-level thresholding were studied. One was a global thresholding method in which the computer retains a pre-selected percentage of pixels with values at the high end of the histogram of the difference image; all pixel values below the threshold are set to a constant. The other was a local thresholding method in which the computer determines the local statistics within a square kernel centered at a pixel of interest; the pixel value is retained only if it is larger than the mean pixel value by a pre-selected multiple of the standard deviation (S.D.). The kernel size must be sufficiently large to give a good estimate of the local background noise fluctuation and was chosen to be 51×51 pixels in this study. Grey-level thresholding results in a "threshold image" in which groups of pixels with values above the threshold are superimposed on an absolutely uniform background.

In performing signal extraction, the computer extracts the signals from the threshold image in the following manner. A boundary detection program is applied to the unprocessed mammogram to determine the breast region. Signal search is then performed in the breast region of the threshold image to determine the location, area, and contrast of each point. An area-thresholding criterion is subsequently imposed on the detected signals to eliminate points having an area smaller than a pre-selected number of pixels. Finally, a clustering criterion is used to identify clusters which contain more than a pre-selected number of signals within a circular region of pre-selected diameter. These pre-selected values were determined from the clinical experience of radiologists and empirically by processing a number of test mammograms with known microcalcifications. Typically an area threshold value of 2 or 3 pixels was used, and a cluster was required to include 3 or more signals within a region 1 to 1.5 cm in diameter. The latter criterion is in keeping with clinical experience which requires that a minimum number of microcalcifications, usually between 3 and 5, must be present before clusters are considered suspicious enough to warrant biopsy.

The above-noted clustering test is performed in software by first searching for two closest islands surviving area thresholding. The centroid of the two island locations is then used as the center of a circle of a preselected diameter for searching the next closest island within the circle. The centroid position is then updated for the three islands and is used as the center of the circle. The process continues until no new islands can be found within the circle, and the group of islands within the circle is defined as a cluster.

In order to evaluate the detection accuracy of our computer algorithm, Monte Carlo methods, as described, for example, by Rubinstein, *Simulation and the Monte Carlo Method* (Willy, New York, 1981), were employed to simulate microcalcifications that were then superimposed on normal mammographic backgrounds. The location, size, and contrast of these simulated signals were thus known and could be used as a definitive standard for comparison with the computer detection results.

In order to evaluate detection accuracy of the computer detection algorithm, six normal mammograms that manifested typical variations in density and structure and did not have microcalcifications were selected for the superimposition of simulated microcalcifications. A section of the mammogram having an area of 700×1000 pixels was used in order to conserve image processing time. For simplicity, the section of a mammogram will be referred to as a "mammogram" in the following discussions. The Monte Carlo program was then employed to generate ten non-overlapping clusters of microcalcifications in each image with each cluster containing eight to ten simulated microcalcifications. The size and contrast of the simulated microcalcifications were chosen based on the experience of radiologists. Generally, calcifications due to malignancy are less than 0.5 mm on a side when roughly equidimensional, or less than 0.5 mm in the short dimension when linear. The input probability distributions of the size, contrast, and location of the simulated microcalcifications on the six mammograms were fixed to form one set of test images.

The computer detection program with user-selected image-processing and signal-extraction parameters was applied to each set of test images. The computer output included the locations of the detected individual signals and the detected clusters. The computer then compared the known locations of the simulated microcalcifications to the detected signals in order to determine the true-positive and false-positive detection events. The detection accuracy was evaluated by means of a performance curve, defined as the relationship between the detection rate of true-positive (TP) clusters and the number of false-positive (FP) clusters detected per image at various grey-level thresholding levels. The dependence of the computer detection accuracy on the image-processing and signal-extraction parameters, as well as on the physical characteristics of the microcalcifications, can then be determined by comparison of the performance curves.

Figure 10A:
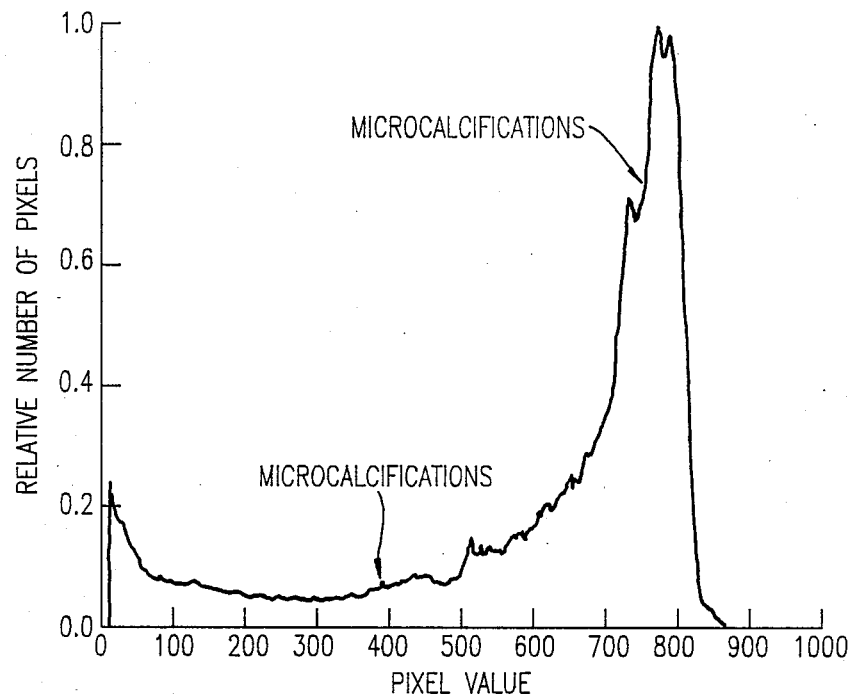
FIGS. 10a and 10b are respectively a histogram of an unprocessed mammogram and a histogram of the difference image obtained from the matched filter (3×3)/contrast-reversal filter ($n_A=9$, $n_B=3$) combination.
Figure 10B:
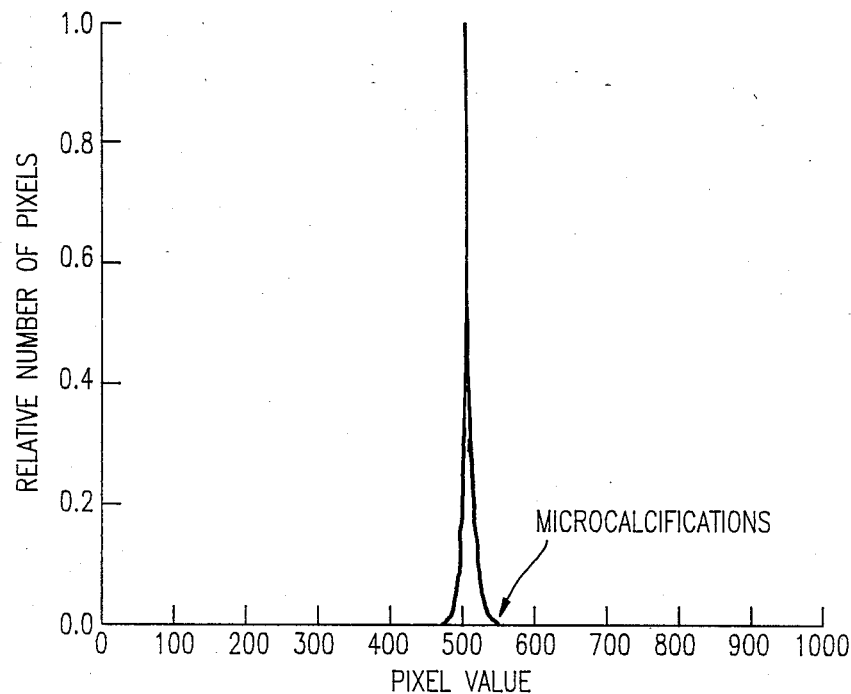

Histograms of unprocessed image data and difference image data are plotted in FIG. 10(a) and 10(b), respectively. For the unprocessed image, the pixel values span almost the entire 10-bit range, and the two clusters of microcalcifications are superimposed on anatomical backgrounds with widely different densities. By comparison, the histogram of the difference image is very narrow and quite symmetrical with a standard deviation of about 8 pixel values; the microcalcifications are located at one end of the histogram. These results demonstrate that the difference-image technique can remove structured background very effectively.

Figure 11:
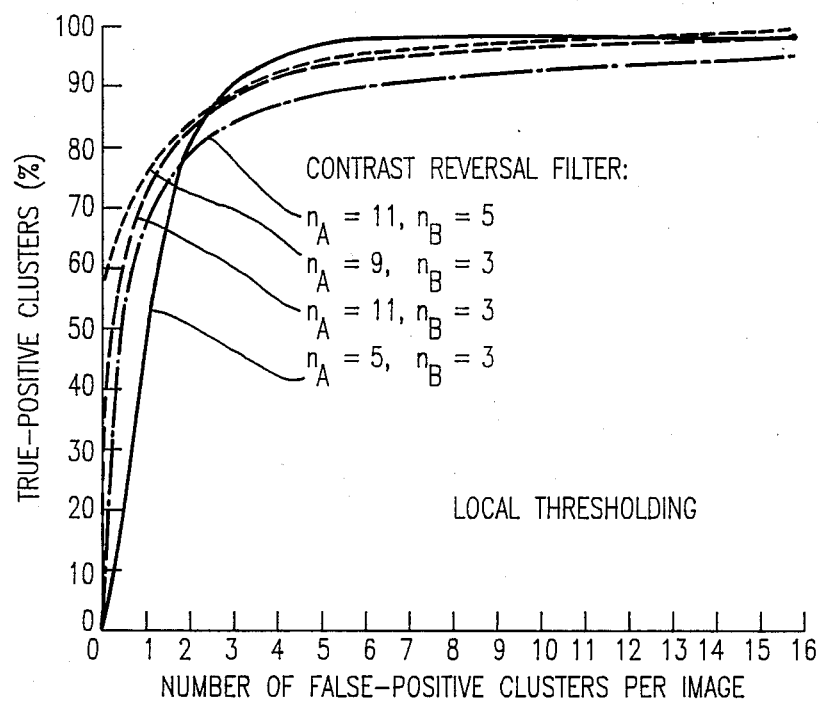
FIG. 11 is a graph illustrating the dependence of detection accuracy on the kernel size of a contrast-reversal filter for a matched filter/contrast-reversal filter combination.

The dependence of computer detection accuracy on the kernel size of the contrast-reversal filter is shown in FIG. 11. When the kernel size of filter B, $n_B$, is fixed at 3×3 and that of filter A, $n_A$, increases from 5 to 9, the TP detection rate increases for FP detection rates below about 2 clusters per image and decreases slightly for higher FP detection rates. However, as $n_A$ increases further to 11, the detection accuracy begins to decrease. The effect of filter B is demonstrated by increasing $n_B$ from 3 to 5 at a fixed $n_A$ of 11. The TP detection rate for $n_B=5$ is lower than that for $n_B=3$ at all FP detection rates. These results therefore indicate that a contrast-reversal filter with $n_A=9$ and $n_B=3$ provides negative OTF components in the frequency range that includes most of the frequency content of the microcalcifications, for the filter combinations and size distributions of the microcalcifications under study. It was attempted to increase the effect of contrast reversal by applying the 3×3 matched filter to the image processed by the contrast-reversal filter with $n_A=9$ and $n_B=3$. The resulting performance curve was almost identical to that without the additional matched filtering, however.

Figure 12:
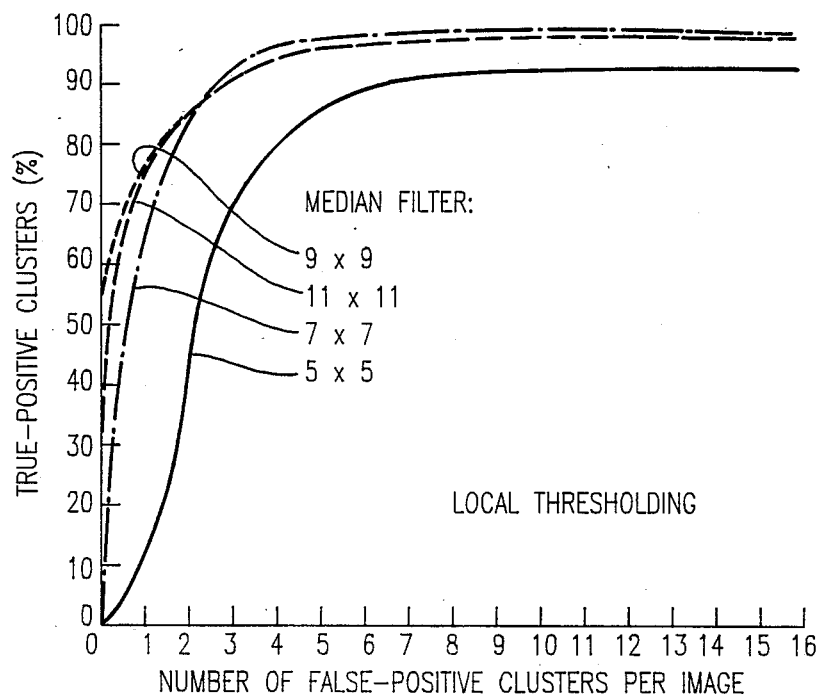
FIG. 12 is a graph illustrating the dependence of detection accuracy on the kernel size of a median filter for a matched filter/median filter combination.

The dependence of the accuracy of computer detection on the kernel size of the median filter is shown in FIG. 12. For a given FP detection rate, the TP detection rate increases rapidly as the kernel size increases from 5 to 7. However, when the kernel size increases to 9, the TP detection rate increases further at FP detection rates below 2 clusters per image but decreases slightly at higher FP detection rates. Additional increase in the kernel size to 11 appears to reduce the TP detection rate at essentially all FP rates.

Figure 13:
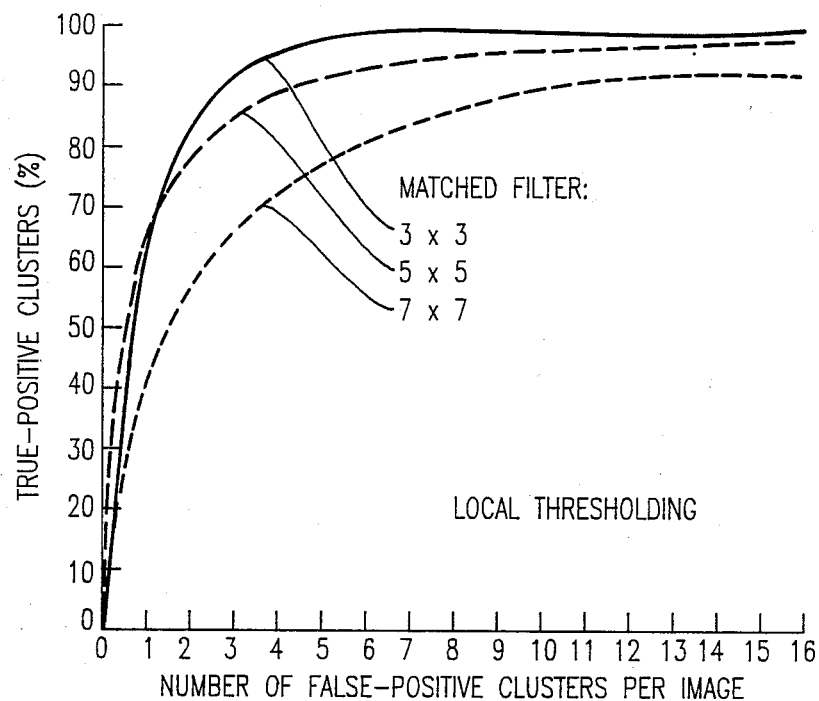
FIG. 13 is a graph illustrating the dependence of detection accuracy on the kernel size of a matched filter for a matched filter/median filter combination.

The effect of the matched filter kernel size used for signal enhancement on detection accuracy was studied by varying the size from 3 to 7. For the matched filter/contrast-reversal filter combination having $n_A=9$ and $n_B=3$, it was found that the performance curves remain basically unchanged for all 3 matched filter sizes. For the matched filter/median filter combination, however, the detection accuracy depends strongly on the matched filter size. The performance curve worsens as the matched filter size increases from 3 to 7 for a fixed 7×7 median filter, as shown in FIG. 13. A 3×3 matched filter was therefore used for most cases in this study.

The effect of the area threshold value, i.e., the size of an island qualifying as a candidate for subsequent evaluation of island clustering, used for the signal area in the signal-extraction process by varying the threshold from 2 to 4 pixels was also assessed. Both the TP and FP detection rates increase as the area threshold value decreases for a given grey-level threshold level. However, the performance curve has relatively weak dependence on the area threshold values for both the matched filter/contrast-reversal filter and the matched filter/median filter combinations, even though different grey-level threshold levels are needed to achieved the same detection accuracy. For the original/median filter combination, the detection accuracy increases as the area threshold increases, especially when global thresholding is used. The stronger dependence on the area threshold value for the original/median filter combination is probably related to the low SNR in its difference image. A large number of random noise points remain in the threshold image in this case and are detected as FP signals if not excluded by the area-thesholding criterion.

Figure 14:
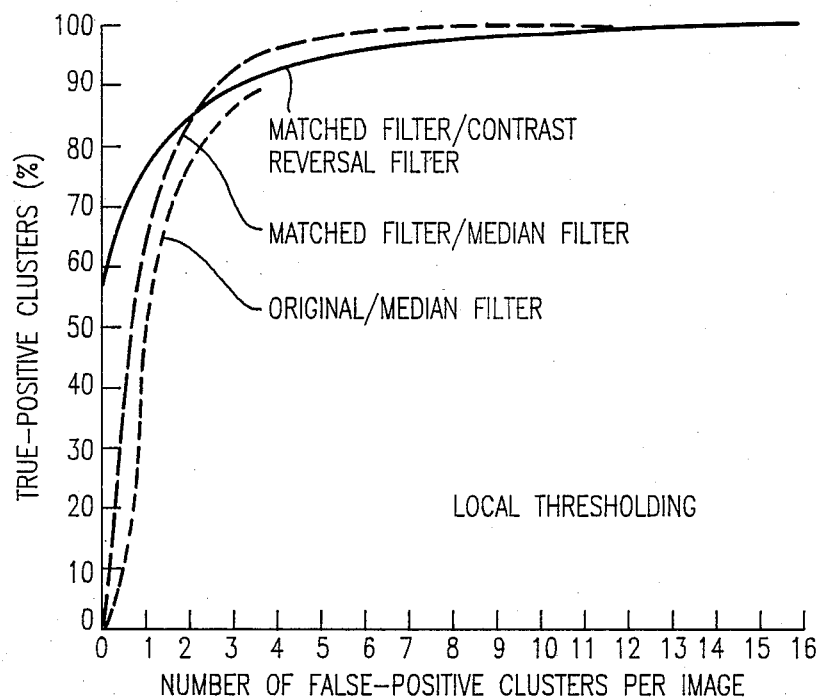
FIG. 14 is a graph comparing the performance of three image-processing methods in combination with local thresholding.

The detection accuracies of the linear and non-linear filtering methods are compared in FIG. 14. The matched filter/contrast-reversal filter with $n_A=9$ and $n_B=3$ is comparable to the matched filter/median filter with $n=9$ (FIG. 12). Both can achieve a TP detection rate of approximately 80% at a FP detection rate of about 1 cluster per image. On the other hand, the matched filter/median filter with $n=7$ provides a higher TP detection rate at high FP detection rates. The effect of the improved SNR achieved by matched filtering is apparent when the curves for the matched filter/median filter and the original/median filter are compared. The detection accuracy obtained with the matched filtering is generally higher because of the increase in the SNR in the signal-enhanced image.

Figure 15:
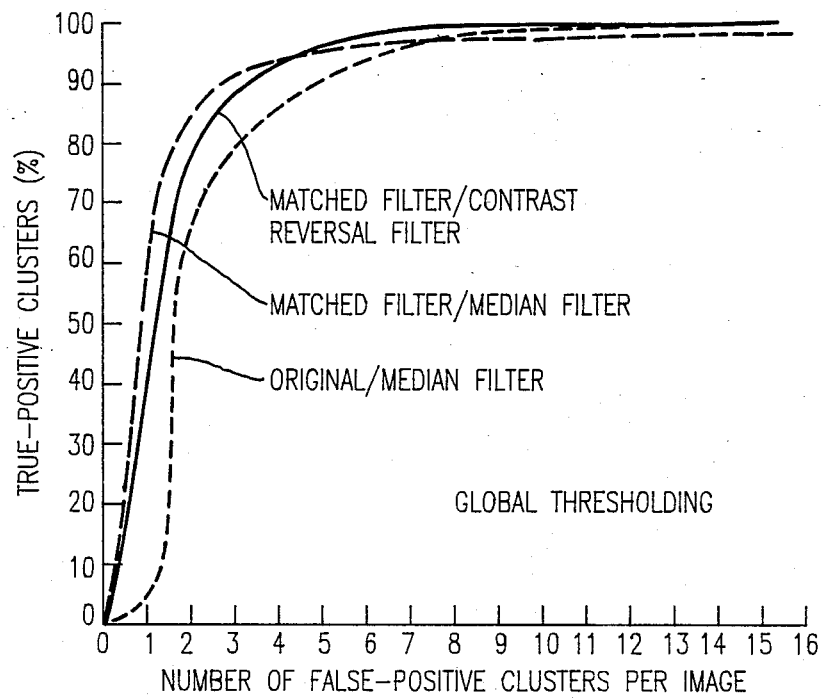
FIG. 15 is a graph comparing the performance of three image-processing methods in combination with global thresholding.

The effect of different grey-level thresholding techniques is shown by comparison of FIG. 14 and FIG. 15. It can be seen that detection accuracy is higher with local thresholding than with global thresholding for all three filter combinations. However, the improvements in detection accuracy for the matched filter/contrast-reversal filter and for the original/median filter combination are much greater than those for the matched filter/median filter combination. This difference was observed also for the other filter parameters studied. Analysis of the histograms of the difference images revealed that the matched filter/median filter combination generally results in a less noisy difference image than the matched filter/contrast reversal filter combination, while the original/median filter combination yields the noisiest difference image. The local thresholding technique thus appears capable of isolating signals from a noisy background more effectively than the global thresholding technique.

Figure 16A:
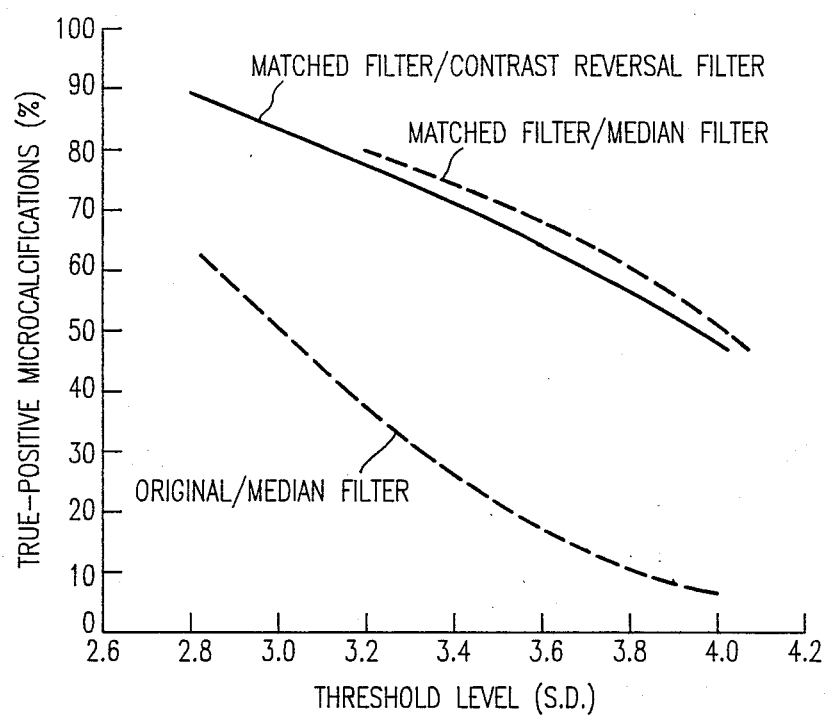
FIGS. 16a and 16b are graphs respectively illustrating the dependence of true-positive detection rate of microcalcifications on local thresholding level and the dependence of false-positive detection rate of microcalcifications on local thresholding level.
Figure 16B:
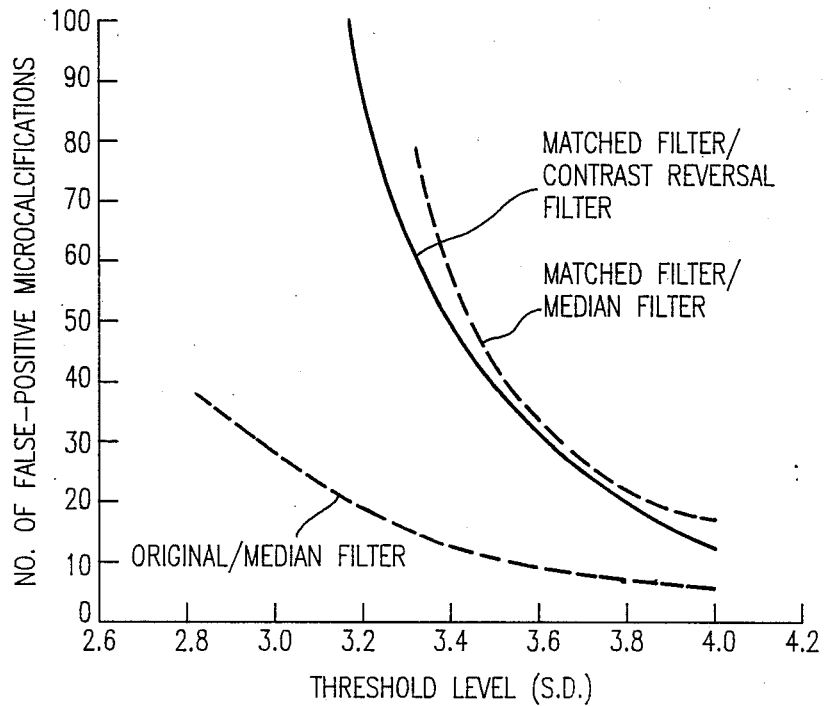

The dependence of the TP and FP detection rates on the local thresholding level for individual microcalcifications is illustrated in FIGS. 16(a) and 16(b), respectively. At a threshold level of 4 S.D. (standard deviations), about 50% of the individual microcalcifications and about 15 false signals were detected in each image (700×1000 pixels) when the matched filter/median filter or the matched filter/contrast-reversal filter combinations were used. At this threshold level, the TP cluster detection rate is about 90%, with a FP detection rate of about 2 clusters per image (FIG. 14). Since each cluster of microcalcifications in the input test images contained about 10 individual microcalcifications and, in the signal-extraction process, a detected cluster was determined as a region containing a minimum of 3 signals within a diameter of 1.2 cm, the results in FIGS. 16a and 16b indicated that similar cluster detection rates can be obtained for clusters containing 6 or more microcalcifications, when the same image-processing techniques and signal-extraction criteria are employed. The detection accuracy for clusters containing different numbers of microcalcifications can be estimated in a similar manner for other image-processing techniques.

Figure 17:
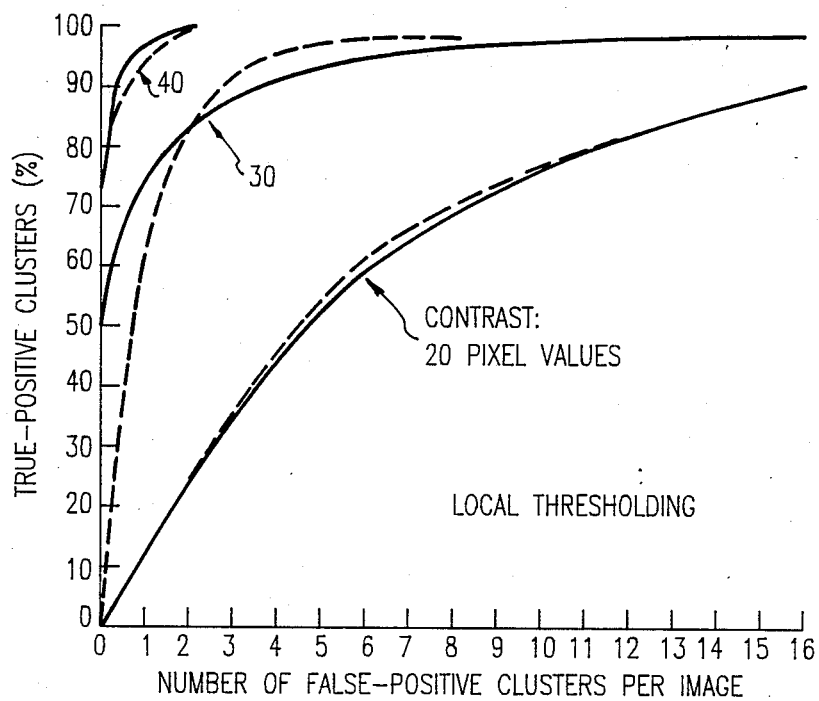
FIG. 17 is a graph illustrating the dependence of detection accuracy on the contrast of microcalcifications.

The dependence of the accuracy of the computer detection algorithm on the contrast of the microcalcifications also was studied. Results for the two filtering methods in combination with local thresholding are shown in FIG. 17. Microcalcifications having maximum contrasts of 20, 30 and 40 pixel values correspond visually to very subtle, moderately subtle, and obvious clinical microcalcifications. Detection accuracy increases rapidly when the contrast of the microcalcifications increases from 20 pixel values to 30 pixel values. The TP detection rate is close to 100% at a contrast of 40 pixel values. The performance of the two filter combinations is similar for low contrast signals, whereas the matched filter/contrast-reversal filter combination provides a higher detection accuracy at FP detection rates below about 2 clusters per image when the signal contrast is moderately high. If global thresholding is used in these detection tasks, detection accuracy decreases for both filter combinations and for all signal contrasts. The decrease is largest when the low contrast signals are processed with the matched filter/contrast-reversal filter combination. With global thresholding, the matched filter/median filter combination is superior to the matched filter/contrast-reversal filter combination for all signal contrasts, though this difference diminishes as the signal contrast increases. These comparisons further indicate that local thresholding is more effective than global thresholding in extracting signals from low SNR images.

The performance of the computer detection program for clinical mammograms was examined in a preliminary study. Clinical mammograms containing a cluster of real microcalcifications of moderate subtlety, corresponding to a signal contrast of about 30 pixel values, were chosen. A matched filter ($3 \times 3$)/contrast-reversal filter ($n_A = 9$ and $n_B = 3$) pair in combination with local thresholding was used. Similar results were obtained with the matched filter ($3 \times 3$)/median filter ($7 \times 7$) combination. One of the mammograms evaluated contained an obvious cluster and a moderately subtle cluster. Both clusters were detected and marked by the computer with circles on the threshold image and also on the original image. No FP cluster was detected in this case. Many isolated points in the threshold image were not included as possible microcalcifications because they did not satisfy the area-threshold and clustering criteria used in the signal-extraction process. For the limited number of clinical cases studied, the TP cluster detection rate was 100% at sufficiently high threshold levels, and a FP cluster was detected in about $\frac{1}{3}$ of the cases.

Figure 18:
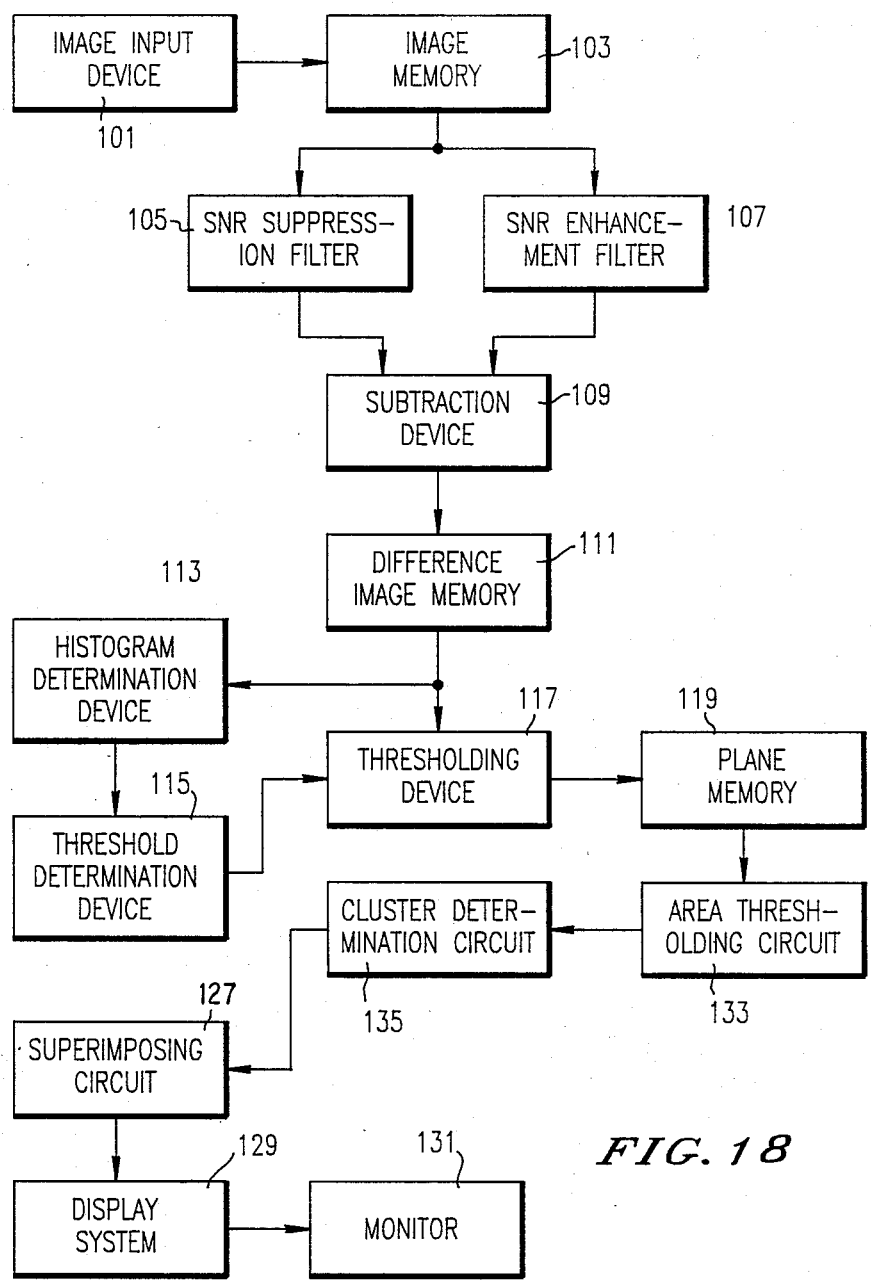
FIG. 18 is a schematic block diagram illustrating in more detail the automated system shown in FIG. 8.

FIG. 18 shows a more detailed block diagram of a system for automated detection of microcalcifications in digital x-ray mammograms using the clustering technique as described above. The elements of FIG. 18 which correspond to elements shown in FIG. 7 are denoted by the same reference numeral designations. The feature extraction elements 121, 123, and 125 in FIG. 7 are replaced respectively with area thresholding circuit 133 in which small area groups of pixels having values above the threshold level are eliminated by comparing to a minimum predetermined number of pixels per predetermined area, and another abnormality determination circuit 135 for identifying clusters of the area groups remaining after area thresholding as being microcalcifications, based on the number of such area groups, represented by islands in the plane memory 119, which exist within a circular region of pre-selected diameter. This is best accomplished by determining the distance between islands identified by the area thresholding, and then determining if the determined distances indicate a predetermined number of islands within a predetermined area.

In the abnormality determination circuit 135 the clusters are determined to be sufficiently suspicious based upon the number of the islands per predetermined area, and video signals corresponding to the location of the clusters on the mammogram are supplied to the display system where the indications of the clusters are superimposed on the original mammogram in the same manner as described above.

The operations of the circuits 133 and 135 in accordance with the invention are above described. After forming threshold image stored in the plane memory 119, the threshold image is searched and processed so that an area thresholding criterion is used by the circuit 133 to eliminate islands consisting of a small number of pixels, for example, below two pixels, as background noise. The remaining islands are then subjected to clustering criteria by the circuit 135 to identify microcalcifications based on the characteristic that microcalcifications are present in the form of clusters within a predetermined circular region.

In a hard-wired system the circuit 135 can automatically measure the distance between islands surviving area thresholding. Based on the result, clusters are identified based on predetermined criteria, for example, a predetermined number of islands each being spaced apart from each other by a predetermined distance in other words, being within a circle of predetermined radius, for example If the predetermined criteria are met, it is determined that the cluster represents microcalcifications in a breast lesion.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for automated detection and indication of an abnormal anatomic region using a digital image, comprising the step of:
    generating a single digital image of an object;
    storing said single image;
    filtering said stored single image to remove anatomic background derived from normal anatomic structure and thereby to enhance in the resulting filtered image an abnormal pattern corresponding to an abnormal anatomic region;
    searching said filtered image to determine a region having said abnormal pattern in said digital image; and
    indicating the position of said abnormal anatomic region in connection with said digital image.

2. The method as defined by claim 1, wherein said step of filtering the stored digital image includes a step of signal-to-noise ratio (SNR) suppressing filtering of said stored image signal, and a step of SNR enhancing filtering of said stored image signal, a step of producing a difference image between said SNR-suppressed image and said SNR-enhanced image.

3. The method as defined in claim 2, wherein said searching step comprises:
    determining which of the pixels of the difference image exceed a predetermined amplitude threshold value;
    identifying contiguous pixels determined by said determining step as discrete islands;
    determining at least one of the circularity and the size of said islands; and
    identifying an abnormality by comparing at least one of the circularity and size of said islands against predetermined criteria.

4. The method as defined in claim 2, wherein said searching step comprises:
    determining which of the pixels of the difference image exceed a predetermined amplitude threshold value;
    identifying contiguous pixels determined by said determining step as discrete islands;
    determining which of the identified islands include at least a minimum predetermined number of contiguous pixels; and
    determining whether the islands which are determined to have at least said minimum number of contiguous pixels meet predetermined clusterization criteria.

5. The method as defined in claim 2, wherein said step of searching comprises:
   determining which of the image pixels of the difference image have a value exceeding a predetermined threshold value;
   measuring predetermined features of contiguous image pixels identified in said determining step; and
   identifying the abnormal anatomic region based on the features measured in said measuring step.

6. The method as defined in claim 5, wherein said measuring step comprises:
   measured predetermined geometric parameters of said contiguous image pixels identified in said thresholding step.

7. The method according to claim 6, wherein the predetermined geometric parameter measured in said measuring steps include circularity and size.

8. The method as defined in claim 2, wherein said step of searching comprises:
   determining which of the image pixels of the difference image have a value exceeding a predetermined threshold value;
   repeating said thresholding step at varied predetermined threshold values;
   measuring, for each performance of said determining step, predetermined features of contiguous image pixels identified in each said measuring step;
   determining variations in said predetermined features as a function of variation of said predetermined threshold values; and
   identifying the abnormal region based on the variations in said predetermined features determined as a function of variation of said predetermined threshold values.

9. The method as defined in claim 8, wherein said measuring step comprises:
   measuring predetermined geometric parameters of said contiguous image pixels.

10. The method as defined in claim 9, wherein the predetermined geometric parameters measured in said measuring step include circularity and size.

11. A system for automated detection and indication of an abnormal anatomic region from a digital image of an object, comprising:
   means for generating a single digital image of said object;
   means for filtering said single digital image to remove anatomic background derived from normal anatomic structure thereby to enhance in the resulting filtered image an abnormal pattern corresponding to an abnormal anatomic region;
   means for searching the filtered digital image to identify said abnormal pattern in the filtered digital image; and
   means for indicating the location of the abnormal anatomic region based on the location of a region of the filtered digital image in which the abnormal pattern is identified.

12. The system as defined in claim 11, wherein said filtering means comprises:
   first means for producing a signal-to-noise ratio (SNR)-suppressed image;
   second means for producing a SNR-enhanced image; and
   third means for producing a difference image based on the difference between said SNR-enhanced and SNR-suppressed images.

13. The system as defined in claim 12, wherein said searching means comprises:
   means for thresholding image pixels of the difference image to identify all image pixels having a value greater than a predetermined threshold value; and
   means for measuring predetermined features of contiguous image pixels identified by said thresholding means; and
   means for identifying the abnormal anatomic region based on the features measured by said measuring means.

14. The system as defined in claim 13, wherein said measuring means comprises:
   means for measuring predetermined geometric parameters of said contiguous image pixels identified by said thresholding means.

15. The system as defined in claim 14, wherein said measuring means includes means for measuring circularity and size of said contiguous image pixels identified by said thresholding means.

16. The system as defined in claim 12, wherein said searching means comprises:
   means for thresholding image pixels of the difference image to identify all image pixels having a value greater than a predetermined threshold value;
   means for repeating said thresholding at varied predetermined threshold values;
   means for measuring, for each performance of said thresholding, predetermined features of contiguous image pixels identified in each repeated performance of said measuring;
   means for determining variations in said predetermined features as a function of variation of said predetermined threshold values; and
   means for identifying the abnormal anatomic region based on the variations in said predetermined features determined by said determining means.

17. The system as defined in claim 16, wherein said measuring means comprises:
   means for measuring predetermined geometric parameters of said contiguous image pixels identified by said thresholding means.

18. The system as defined in claim 17, wherein said measuring means includes means for measuring circularity and size of said contiguous image pixels identified by said thresholding means.

19. The system according to claim 16, wherein said searching means comprises:
   means for determining which of the pixels of the difference image exceed a predetermined amplitude threshold value;
   means for identifying contiguous pixels determined by said determining step as discrete islands;
   means for determining which of the identified islands include at least a minimum predetermined number of contiguous pixels; and
   means for determining whether the islands which are determined to have at least said minimum number of pixels meet predetermined clusterization criteria.

20. An apparatus for automated detection and indication of an abnormal region in an object, comprising:
   image generating means for generating a digital X-ray image signal of the object;
   storing means for storing said digital image signal generated by said generating means;

first processing means for filtering said stored digital X-ray image signal and producing a signal-to-noise ratio (SNR)-suppressed image;

second processing means for filtering said stored digital X-ray image signal and producing a signal-to-noise ratio (SNR)-enhanced image;

third processing means for producing a difference image between said SNR-suppressed image and SNR-enhanced image;

means for searching said difference image, and extracting and determining abnormal regions in the difference image, locating means for locating said determined regions with abnormal features, and producing a location signal corresponding to the abnormal region in said digital X-ray image signal; and indicating means for displaying the indication of the abnormal region responsive to said location signal in connection with said original X-ray image.

* * * * *

UNITED STATES PATENT AND TRADEMARK OFFICE
CERTIFICATE OF CORRECTION

PATENT NO. : 4,907,156
DATED : March 6, 1990
INVENTOR(S) : KUNIO DOI, ET AL

It is certified that error appears in the above-identified patent and that said Letters Patent is hereby corrected as shown below:

In Column 1, line 5, before "BACKGROUND OF THE INVENTION" insert the following paragraph:

The present invention was made in part with U.S. Government support under grant number 2 R01 CA24806-11 from the Department of Health and Human Services and National Cancer Institute. The U.S. Government has certain rights in the invention.

Signed and Sealed this

Twenty-eighth Day of April, 1992

Attest:

HARRY F. MANBECK, JR.

*Attesting Officer*     *Commissioner of Patents and Trademarks*